(12) United States Patent
Bringuier et al.

(10) Patent No.: US 10,712,521 B2
(45) Date of Patent: Jul. 14, 2020

(54) FIBER OPTIC CABLE WITH SLEEVE

(71) Applicant: Corning Optical Communications LLC, Hickory, NC (US)

(72) Inventors: Anne Germaine Bringuier, Taylorsville, NC (US); Rodney Maurice Burns, Conover, NC (US); Keith Aaron Greer, Morganton, NC (US); Warren Welborn McAlpine, Hickory, NC (US); Joel Laine Parker, Hickory, NC (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 696 days.

(21) Appl. No.: 15/190,656

(22) Filed: Jun. 23, 2016

(65) Prior Publication Data
US 2016/0306130 A1 Oct. 20, 2016

Related U.S. Application Data

(63) Continuation of application No. PCT/US2014/069233, filed on Dec. 9, 2014.

(60) Provisional application No. 61/921,769, filed on Dec. 30, 2013.

(51) Int. Cl.
*G02B 6/44* (2006.01)

(52) U.S. Cl.
CPC ......... *G02B 6/4494* (2013.01); *G02B 6/4433* (2013.01)

(58) Field of Classification Search
CPC .. G02B 6/4433; G02B 6/4434; G02B 6/4436; G02B 6/4494
See application file for complete search history.

(56) References Cited

U.S. PATENT DOCUMENTS

| | | | | | |
|---|---|---|---|---|---|
| 5,155,789 | A | * | 10/1992 | Le Noane | G02B 6/441 385/102 |
| 5,343,549 | A | * | 8/1994 | Nave | G02B 6/4436 385/103 |
| 5,388,175 | A | * | 2/1995 | Clarke | G02B 6/4401 385/100 |
| 5,561,195 | A | * | 10/1996 | Govoni | B32B 27/32 525/240 |

(Continued)

FOREIGN PATENT DOCUMENTS

| | | |
|---|---|---|
| EP | 1610163 B1 | 10/2011 |
| JP | 08218286 A * | 8/1996 |
| WO | WO 02074843 A2 * | 8/2002 |

OTHER PUBLICATIONS

Hoop Stress of Tube—Relation to Internal Pressure, available at https://en.wikipedia.org/wiki/Cylinder_stress.*

(Continued)

*Primary Examiner* — Peter Radkowski
(74) *Attorney, Agent, or Firm* — William D. Doyle

(57) ABSTRACT

A fiber optic cable includes a core assembly including an optical fiber, a polymeric sleeve surrounding the core assembly, water-swellable material integrated with the polymeric sleeve, and a jacket surrounding the polymeric sleeve. The polymeric sleeve is continuous peripherally around the core assembly, forming a continuous closed loop when viewed in cross-section, and continuous lengthwise along a length of the cable.

20 Claims, 5 Drawing Sheets

(56) References Cited

U.S. PATENT DOCUMENTS

| | | | | |
|---|---|---|---|---|
| 5,675,686 A * | 10/1997 | Rosenmayer | G02B 6/443 | 385/114 |
| 5,684,904 A * | 11/1997 | Bringuier | G02B 6/4494 | 385/106 |
| 6,195,487 B1 * | 2/2001 | Anderson | G02B 6/4416 | 174/23 R |
| 6,228,449 B1 * | 5/2001 | Meyer | B62D 25/2072 | 428/218 |
| 6,317,540 B1 * | 11/2001 | Foulger | G02B 6/4469 | 324/555 |
| 6,348,249 B2 * | 2/2002 | Meyer | | 428/218 |
| 6,480,653 B1 * | 11/2002 | Hulin | G02B 6/4413 | 385/100 |
| 6,483,971 B2 * | 11/2002 | Gaillard | G02B 6/443 | 385/113 |
| 6,519,399 B2 * | 2/2003 | Strong | G02B 6/4411 | 385/109 |
| 6,546,712 B2 * | 4/2003 | Moss | G02B 6/449 | 242/413.5 |
| 6,574,400 B1 * | 6/2003 | Lail | G02B 6/4494 | 385/100 |
| 6,640,033 B2 * | 10/2003 | Auvray | G02B 6/4436 | 385/109 |
| 6,993,226 B2 * | 1/2006 | Castellani | C08L 23/16 | 385/100 |
| 7,212,715 B2 * | 5/2007 | Dallas | G02B 6/4434 | 385/100 |
| 7,406,233 B2 * | 7/2008 | Seddon | G02B 6/4494 | 385/100 |
| 7,619,038 B2 * | 11/2009 | Mehta | C08L 23/10 | 524/515 |
| 7,790,641 B2 * | 9/2010 | Baker, Jr. | A41D 31/02 | 428/364 |
| 8,063,148 B2 * | 11/2011 | Gahleitner | C08J 3/005 | 525/191 |
| 8,173,900 B2 * | 5/2012 | Martinez | H01B 3/441 | 174/102 R |
| 8,265,438 B2 * | 9/2012 | Knoch | G02B 6/441 | 385/111 |
| 8,620,124 B1 * | 12/2013 | Blazer | G02B 6/4489 | 385/102 |
| 8,798,417 B2 * | 8/2014 | Blazer | G02B 6/4489 | 385/112 |
| 9,971,101 B2 | 5/2018 | Bringuier et al. | | |
| 2002/0122640 A1 * | 9/2002 | Strong | G02B 6/4411 | 385/114 |
| 2003/0103742 A1 * | 6/2003 | Auvray | G02B 6/4436 | 385/109 |
| 2003/0168243 A1 * | 9/2003 | Jamet | G02B 6/4482 | 174/113 R |
| 2004/0223707 A1 | 11/2004 | Parsons et al. | | |
| 2005/0016755 A1 * | 1/2005 | Martinez | H01B 3/441 | 174/120 R |
| 2005/0063650 A1 * | 3/2005 | Castellani | C08L 23/16 | 385/100 |
| 2005/0238300 A1 * | 10/2005 | Jamet | G02B 6/4438 | 385/100 |
| 2005/0286843 A1 * | 12/2005 | Dallas | G02B 6/4434 | 385/109 |
| 2006/0183860 A1 * | 8/2006 | Mehta | C08L 23/10 | 525/191 |
| 2007/0054579 A1 * | 3/2007 | Baker, Jr. | A41D 31/02 | 442/364 |
| 2008/0118211 A1 * | 5/2008 | Seddon | G02B 6/4494 | 385/114 |
| 2008/0153997 A1 * | 6/2008 | Casty | C08F 10/06 | 526/88 |
| 2009/0016687 A1 * | 1/2009 | Kang | G02B 6/4494 | 385/128 |
| 2009/0068453 A1 * | 3/2009 | Chung | B32B 27/08 | 428/337 |
| 2009/0074364 A1 * | 3/2009 | Bringuier | G02B 6/02357 | 385/103 |
| 2010/0027949 A1 | 2/2010 | Bringuier et al. | | |
| 2010/0067856 A1 * | 3/2010 | Knoch | G02B 6/441 | 385/111 |
| 2010/0331490 A1 * | 12/2010 | Gahleitner | C08J 3/005 | 525/209 |
| 2011/0135816 A1 * | 6/2011 | Burns | B29C 47/0014 | 427/163.2 |
| 2012/0006373 A1 * | 1/2012 | Stehly | E04H 15/50 | 135/140 |
| 2012/0063731 A1 * | 3/2012 | Fitz | G02B 6/4495 | 385/104 |
| 2012/0257864 A1 * | 10/2012 | Consonni | G02B 6/441 | 385/112 |
| 2015/0177471 A1 | 6/2015 | Bringuier et al. | | |

OTHER PUBLICATIONS

Patent Cooperation Treaty, International Search Report and Written Opinion for PCT/US2014/069233, dated Feb. 19, 2015, 10 pages.

Nextrom, "SZ Stranding Line OFC 70," 2 pages, Last accessed on Feb. 21, 2014 from http://www.nextrom.com/877_en_SZ-Stranding-Line.aspx.

Marik, J., "Advanced SZ Stranding Technology for Enhanced Applications," 4 pages, Last accessed on Feb. 21, 2014 from http://rosendahlaustria.com/custom/rosendahl austria/Rosendahl_Products_PDF/1062003111324_p1_.pdf.

Rechberger, M., Hörschläger, W., "Buffering & SZ-Stranding Process for Compact Dry Tube FO-Cable," Proceedings of the 56th Annual International Wire & Cable Symposium, 2007,—pp. 614-617, Last accessed on Feb. 24, 2014 from http://ecadigitallibrary.com/pdf/IWCS07/15_5.pdf.

English Translation to CN201480073047.9 First Office Action dated Jun. 28, 2018, China Patent Office.

EP14815558.3 Notice of Allowance dated May 10, 2019, European Patent Office, 35 Pgs.

* cited by examiner

FIBER OPTIC CABLE WITH SLEEVE

RELATED APPLICATIONS

This application is a continuation of International Application No. PCT/US14/69233 filed on Dec. 9, 2014, which claims the benefit of priority to U.S. Provisional Application No. 61/921,769, filed Dec. 30, 2013, both applications being incorporated herein by reference.

BACKGROUND

Aspects of the present disclosure relate generally to cables, such as fiber optic cables that may support and carry optical fibers as well as other cable components.

"Dry" fiber optic cables typically use components that include water-swellable material to block flows of water through the cables. The water-swellable material expands to fill air pathways formed between cabled components within the cable when exposed to water, thereby blocking the flow of water through the cable. Typically the water-swellable powder is carried on a yarn or between nonwoven laminates in a tape. Carrying the water-swellable powder on such a medium helps to limit migration of the powder within the cable, such as when the cable bends or stretches and then contracts. However, Applicants have found that water-swellable tapes and yarns may have drawback in manufacturing, such as dropping the water-swellable powder particles on the manufacturing floor, and/or coming in limited lengths that then need to be spliced or otherwise continued for longer length cables. Similar such issues may be present with fire-retardant tapes.

A need exists for a system to support water-blocking a fiber optic cable that reduces and/or eliminates issues associated with conventional water-swellable tapes and yarns.

SUMMARY

One embodiment relates to a fiber optic cable that includes a core assembly including an optical fiber, a polymeric sleeve surrounding the core assembly, water-swellable material integrated with the polymeric sleeve, and a jacket surrounding the polymeric sleeve. The polymeric sleeve is extruded and is continuous peripherally around the core assembly, forming a continuous closed loop when viewed in cross-section, and continuous lengthwise along a length of the cable. The polymeric sleeve draws down following extrusion and tightly conforms to the shape of the underlying core assembly. Further, the water-swellable material integrated with the polymeric sleeve may be partitioned to mitigate or even prevent slow migration of water through the cable, such as by wicking in nonwoven material and/or between adjacent particles of water-swellable powder.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures and/or described elsewhere in the text.

Figure 1:
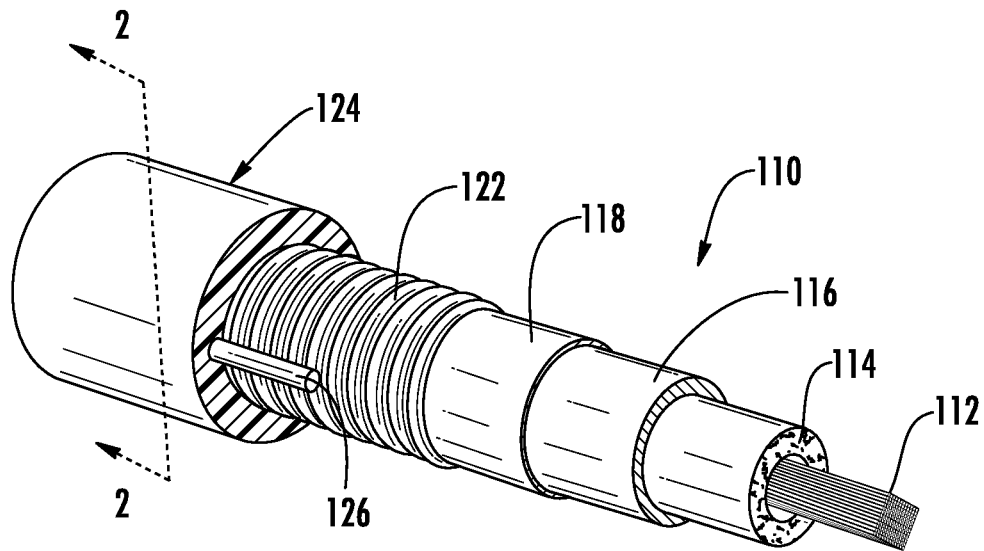
FIG. 1 is a perspective view of a fiber optic cable according to an exemplary embodiment.
Figure 2:
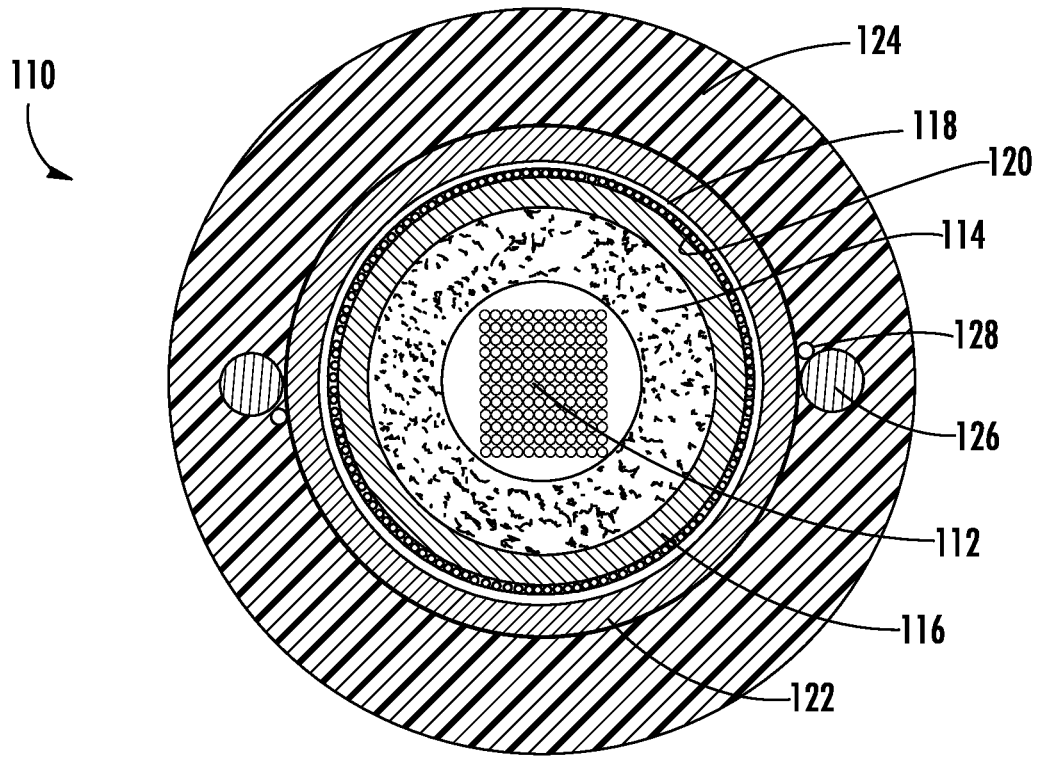
FIG. 2 is a cross-sectional view of the fiber optic cable of FIG. 1 taken along line 2-2 shown in FIG. 1.

Referring to FIGS. 1-2, a fiber optic cable in the form of a central-tube cable 110 includes one or more optical fibers, such as a stack of fiber optic ribbons 112. The stack 112 is surrounded by a water-blocking material 114, such as a water-blocking gel or a water-blocking tape. The water-blocking material 114 and ribbon 112 stack fill a tube, such as a buffer tube 116. Instead of conventional water-blocking tape or other material surrounding the tube, a water-blocking sleeve 118 adjoins the buffer tube 116. Armor 122, in the form of another tube, such as a tube of corrugated steel, surrounds the water-blocking sleeve 118, and a jacket 124 of the cable 110 is extruded over the armor 122. Strength members 126 may be embedded in the jacket 124 or elsewhere placed in the cable to provide extra strength to the cable 110. Access features, such as ripcords 128, may be embedded in or located beneath the jacket 124, the armor 122, and/or the buffer tube 116.

According to an exemplary embodiment, the sleeve 118 tightly surrounds and conforms to the exterior of the tube. In some embodiments, the sleeve 118 is polymeric, such as formed primarily from polyethylene, polypropylene, or another polymer (e.g., 50% or more by weight; 70% or more). In some embodiments, the sleeve is continuous peripherally around the core assembly, forming a continuous closed loop when viewed in cross-section, and continuous lengthwise along a length of the cable that is at least 10 meters. Additionally, the sleeve 118 includes water-swellable powder 120 coupled thereto (e.g., bonded thereto, attached thereto, partially-embedded thereto, stuck thereto), such as on an inside surface and/or outside surface thereof.

Figure 3:
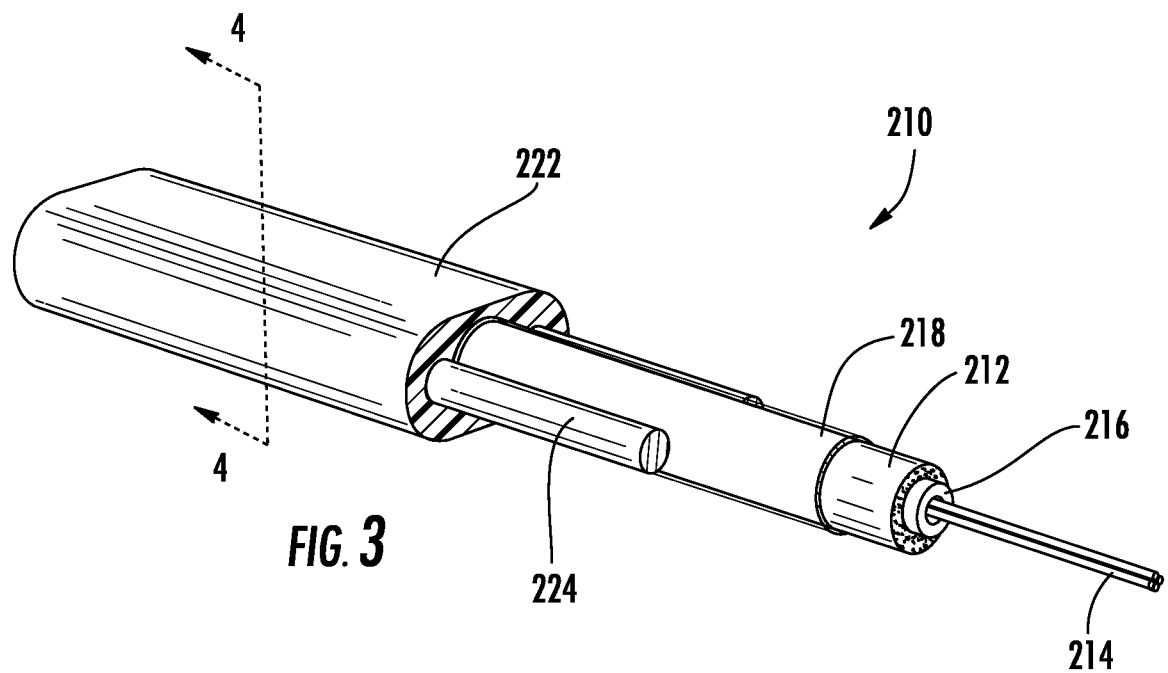
FIG. 3 is a perspective view of a fiber optic cable according to another exemplary embodiment.
Figure 4:
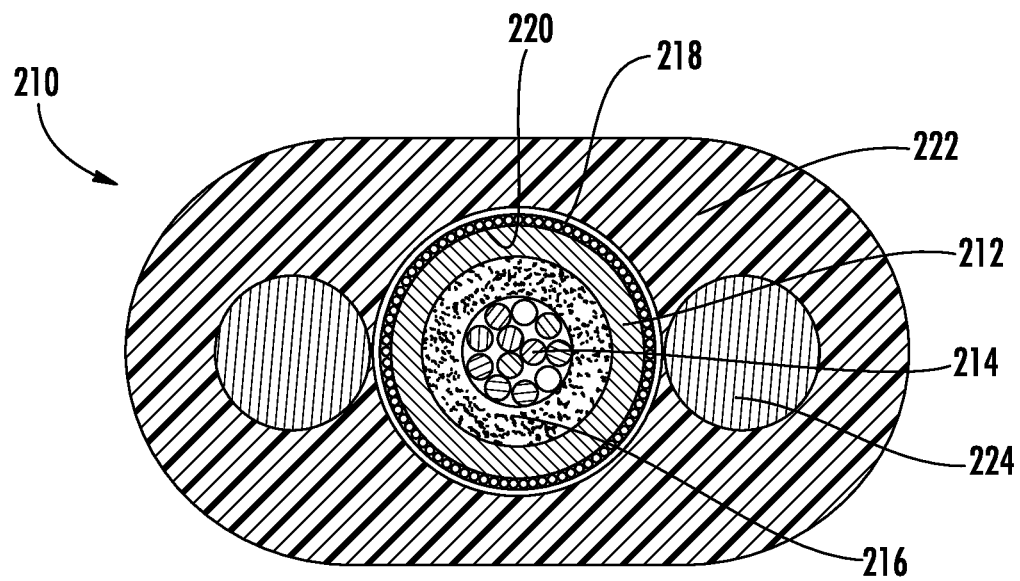
FIG. 4 is a cross-sectional view of the fiber optic cable of FIG. 3 taken along line 4-4 shown in FIG. 3.

Referring now to FIGS. 3-4, a fiber optic cable in the form of a flat drop cable 210 includes a buffer tube 212 containing optical fibers, such as loose optical fibers 214. The buffer tube 212 may include water-blocking material, such as gel 216, water-swellable yarn(s), water-swellable powder embedded in a wall of the buffer tube 212 or other water-blocking materials. A sleeve 218 surrounds the buffer tube 116 and holds water-swellable powder 220 exposed to an exterior side of the sleeve (i.e., not fully embedded in the sleeve). Exposure of the particle allows rapid expansion upon contact with water. The sleeve 218 is similar to the sleeve 118 of FIG. 1 in that the sleeve 218 adjoins the exterior of a core assembly, the buffer tube 212 surrounding the optical fibers 214, and in that the sleeve 218 supports the water-swellable powder 220, providing water-blocking around the core assembly. Surrounding the sleeve 218, the cable 210 includes a jacket 222 having two relative flat sides. Strength members, in the form of rods 224 of metal or dielectric material are embedded in the jacket 222.

Figure 5:
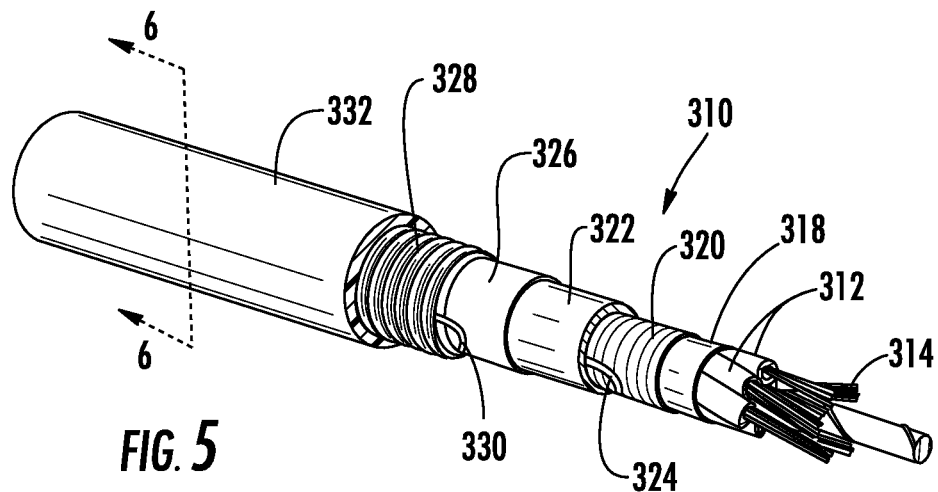
FIG. 5 is a perspective view of a fiber optic cable according to yet another exemplary embodiment.
Figure 6:
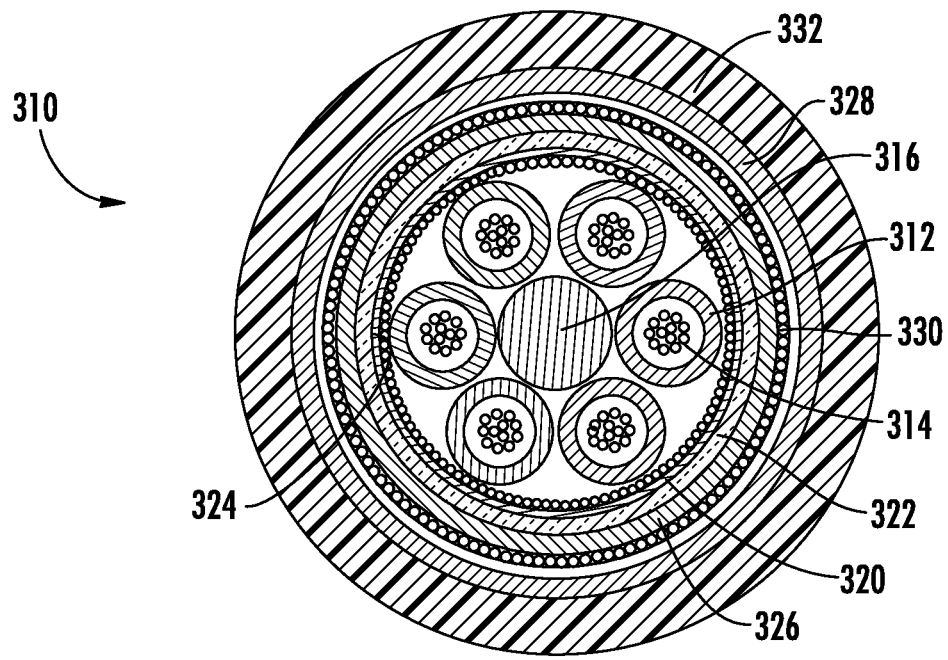
FIG. 6 is a cross-sectional view of the fiber optic cable of FIG. 5 taken along line 6-6 shown in FIG. 5.

Referring to FIGS. 5-6, a fiber optic cable in the form of a loose tube cable 310 includes a plurality of buffer tubes 312 (e.g., at least two, at least four) containing optical fibers in the form of loose optical fibers 314. The buffer tubes 312 are stranded around a central strength member 316, such as a rod of glass-reinforced plastic, metal, or another material. Other elements, such as dummy rods may also be stranded with the buffer tubes 312. As shown in FIG. 5, according to an exemplary embodiment, binder yarns 318 (e.g., polyester cords) hold the buffer tubes 312 in a stranded configuration. The binder yarns 318, may be crisscrossing one another, wound in a counter-helical manner, or may be otherwise arranged.

Still referring to FIGS. 5-6, a first sleeve 320 surrounds the buffer tubes 312, such as contacting the buffer tubes 312 and/or the binder yarns 318. An inner jacket 322 surrounds the first sleeve 320 and may include a ripcord 324 or other access feature beneath the inner jacket 322. A second sleeve 326 surrounds the inner jacket 322, such as adjoins and/or contact the inner jacket 322; and armor 328 (e.g., corrugated steel, copper, aluminum; rigid polyvinyl chloride, such as at least 65 Shore-D, at least 75 Shore-D), similar to the armor 122 of FIG. 1, surrounds the second sleeve 326. A ripcord 330 may be located beneath the armor 328, and an outer jacket 332 surrounds the armor 328.

Structurally, compositionally, and functionally, the first and second sleeves 320, 326 may be generally the same as one another, and may include the attributes of other sleeves 118, 218, 426, 516 disclosed herein. For example, both the first and second sleeves 320, 326 may be formed from a polymeric material, such as an extruded polyethylene. According to an exemplary embodiment, both the first and second sleeves 320, 326 include water-swellable powder attached thereto. However, the first and second sleeves 320, 326 may have differences. For example, the first sleeve 320 may include water-swellable powder embedded on an inside surface of the first sleeve 320, to water-block interstices and other gaps of the core assembly. The outer surface of the first sleeve 320 may be bonded to the interior surface of the inner jacket 322. Further, water-swellable powder may be attached to the outer surface of the second sleeve 326, with the inner surface of the second sleeve 326 bonded to the exterior surface of the inner jacket 322. As such, the second sleeve 326 may block water from flowing between the inner jacket 322 and the interior of the armor 328. Bonding of the sleeves 320, 326 to the jacket 322 may anchor the sleeves in place, and may allow for faster access to the core where both sleeves 320, 326 are removed at the same time as the jacket 322.

According to an exemplary embodiment, the buffer tubes 312 may contain two, four, six, twelve, twenty-four or other numbers of optical fibers 314. In some embodiments, the buffer tubes 312 further include a water-blocking element, such as gel (e.g., grease, petroleum-based gel) or an absorbent polymer (e.g., super-absorbent polymer particles or powder). In some such embodiments, the buffer tubes 312 include yarn carrying (e.g., impregnated with) super-absorbent polymer, such as at least one water-blocking yarn, at least two such yarns, or at least four such yarns per buffer tube 312. In other contemplated embodiments, the buffer tubes 312 include super-absorbent polymer without a separate carrier, such as where the super-absorbent polymer is loose or attached to interior walls of the tube. In some such embodiments, particles of super-absorbent polymer are partially embedded in walls of the buffer tubes 312 (interior and/or exterior walls of the tube) or bonded thereto with an adhesive. For example, the particles of super-absorbent polymer may be pneumatically sprayed onto the buffer tubes 312 walls during extrusion of the buffer tubes 312 and embedded in the buffer tubes 312 while the buffer tube 312 is tacky, such as from extrusion processes. Different than the sleeves 320, 326 the buffer tubes 312 with embedded water-swellable powder may be designed not to contract onto the underlying element (e.g., optical fibers), and thereby provide spacing to mitigate micro-bend attenuation.

According to an exemplary embodiment, the at least one optical fiber 314 of the tube 312 is a glass optical fiber, having a fiber optic core surrounded by a cladding. Some such glass optical fibers may also include one or more polymeric coatings. The optical fiber 314 of the tube 312 is a single mode optical fiber in some embodiments, a multi-mode optical fiber in other embodiments, a multi-core optical fiber in still other embodiments. The optical fiber 314 may be bend resistant (e.g., bend insensitive optical fiber, such as CLEARCURVE™ optical fiber manufactured by Corning Incorporated of Corning, N.Y.). The optical fiber 314 may be color-coated and/or tight-buffered. Other optical fibers disclosed herein, may be similarly structured. For example, the optical fiber 314 may be one of several optical fibers aligned and bound together in a fiber ribbon form, such as ribbon 112 as shown in FIG. 1.

In other contemplated embodiments, the cable 310 or other cables disclosed herein may also or alternatively include straight or stranded conductive wires (e.g., copper or aluminum wires) or other elements, such as stranded along with the buffer tubes 312 of optical fibers 314.

Referring now to FIGS. 1-6, the cables 110, 210, 310 includes the sleeves 118, 218, 320, 326 (e.g., tubular films, impermeable barriers, membranes) surrounding the corresponding core assemblies (e.g., interior components), exterior to some or all of the core elements, such as the tubes 116, 212, 312, and/or 322. In some embodiments, the sleeves 118, 218, 320, 326 directly contact the underlying core assemblies, including some or all of the core elements. Close contact between the sleeves 118, 218, 320, 326 and the corresponding core elements facilitates water blocking by reducing the gap(s) space through which water may flow therebetween. The water-blocking function is additionally enhanced in embodiments having water-blocking powder bonded to the sleeves 118, 218, 320, 326.

In contemplated embodiments of cables similar to the cable 310, tension T (e.g., radial elastic extension) in the sleeves 118, 218, 320, 326 may hold the buffer tubes 312 against a central strength member 316 and/or against one another in addition to the binder yarns 318 or as an alternative thereto. The loading provided by the sleeves 118, 218, 320, 326 may further increase interfacial loading (e.g., friction) between the buffer tubes 312 with respect to one another and other components of the cable 310, thereby constraining the buffer tubes 312.

According to an exemplary embodiment, the sleeves 118, 218, 320, 326 include (e.g., are formed from, are formed primarily from, have some amount of) a polymeric material such as polyethylene (e.g., low-density polyethylene, medium density polyethylene, high-density polyethylene), polypropylene, polyurethane, or other polymers. In some embodiments, the sleeves 118, 218, 320, 326 includes at least 70% by weight polyethylene, and may further include stabilizers, nucleation initiators, fillers, fire-retardant additives, reinforcement elements (e.g., chopped fiberglass fibers), and/or combinations of some or all such additional components or other components.

According to an exemplary embodiment, the sleeves 118, 218, 320, 326 are formed from a material having a Young's modulus of 3 gigapascals (GPa) or less, thereby providing a relatively high elasticity or springiness to the sleeves 118, 218, 320, 326 so that the sleeves 118, 218, 320, 326 may conform to the shape of the core elements 114. In other embodiments, the sleeves 118, 218, 320, 326 are formed from a material having a Young's modulus of 5 GPa or less, 2 GPa or less, or a different elasticity, which may not be relatively high.

According to an exemplary embodiment, the sleeves 118, 218, 320, 326 are thin, such as 0.5 mm or less in thickness (e.g., about 20 mil or less in thickness, where "mil" is 1/1000th inch). In some such embodiments, the sleeves 118, 218, 320, 326 are 0.2 mm or less (e.g., about 8 mil or less), such as greater than 0.05 mm and/or less than 0.15 mm. In some embodiments, the sleeves 118, 218, 320, 326 are in a range of 0.4 to 6 mil in thickness, or another thickness. In contemplated embodiments, the sleeves 118, 218, 320, 326 may be greater than 0.5 mm and/or less than 1.0 mm in thickness. In some cases, for example, the sleeves 118, 218, 320, 326 have roughly the thickness of a typical garbage bag.

The thickness of the sleeves 118, 218, 320, 326 may be less than a tenth the maximum cross-sectional dimension of the corresponding cable 110, 210, 310, such as less than a twentieth, less than a fiftieth, less than a hundredth, while in other embodiments the sleeves 118, 218, 320, 326 may be otherwise sized relative to the cable cross-section. In some embodiments, when comparing average cross-sectional thicknesses, the jackets 124, 222, 322, 332 are thicker than the sleeves 118, 218, 320, 326, such as at least twice as thick as the sleeves 118, 218, 320, 326, at least ten times as thick as the sleeves 118, 218, 320, 326, at least twenty times as thick as the sleeves 118, 218, 320, 326. In other contemplated embodiments, a jacket may be thinner than the corresponding sleeves 118, 218, 320, 326, such as with a 0.4 mm nylon skin-layer jacket extruded over a 0.5 mm sleeve embodiment.

The thickness of the sleeves 118, 218, 320, 326 may not be uniform around the core assembly, such as the tube 116, 212, tubes 312, or jacket/tube 322. Applicants have found some migration of the material of the sleeves 118, 218, 320, 326 during manufacturing. For example, the belts 412 (e.g., treads, tracks) of the caterpuller 410 shown in FIG. 7 may impart compressive forces on the sleeves 118, 218, 320, 326 that displace the material while it is in a low viscosity state (e.g., somewhat flatten the sleeves 118, 218, 320, 326 on opposing sides thereof), as the sleeves 118, 218, 320, 326 solidify, draw-down, and/or contract around the corresponding underlying component. As such, the "thickness" of the sleeves 118, 218, 320, 326, as used herein, is an average thickness around the cross-sectional periphery. For example, the somewhat flattened portions of the sleeves 118, 218, 320, 326 caused by the caterpuller 410 may be at least 20% thinner than the adjoining portions of the sleeves 118, 218, 320, 326 and/or the average thickness of the sleeves 118, 218, 320, 326.

Figure 7:
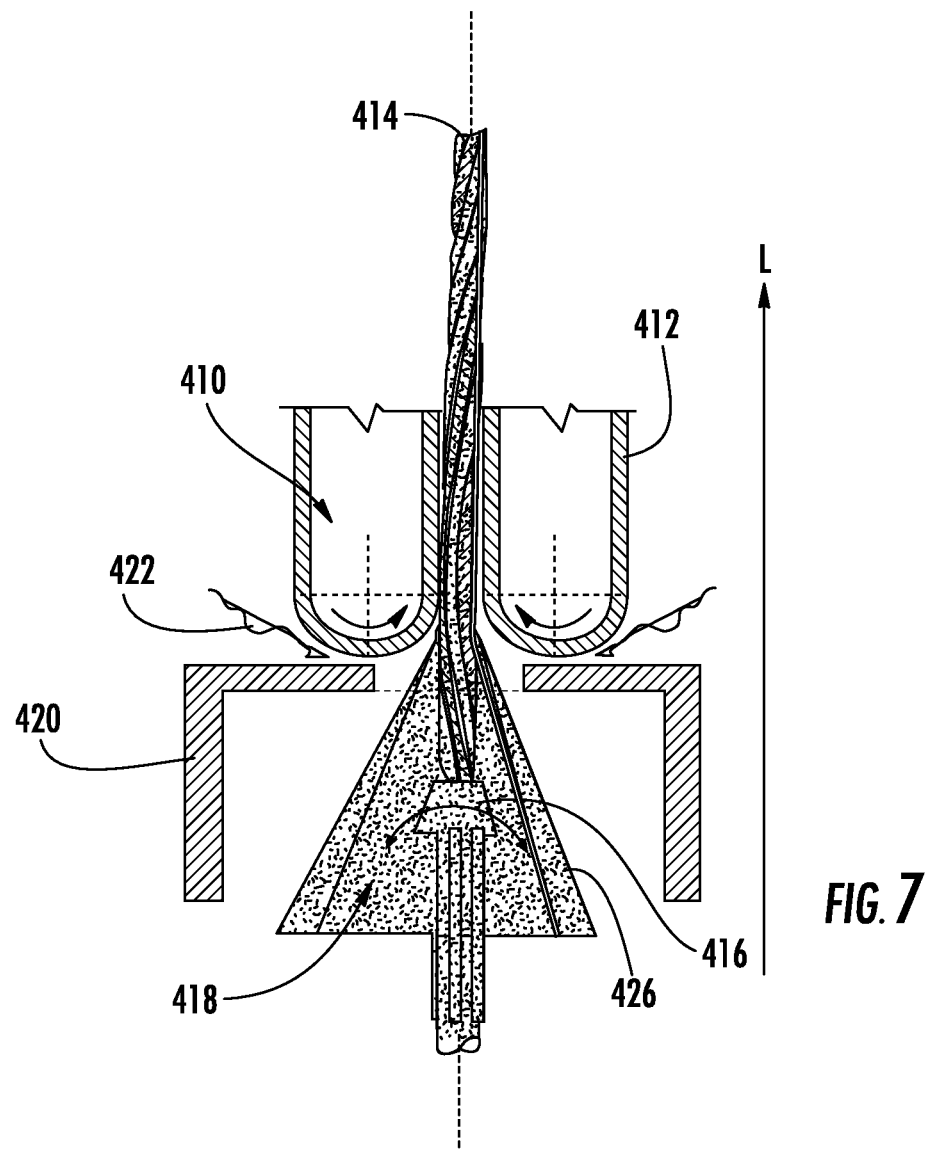
FIG. 7 is a schematic diagram of a cable being manufactured according to an exemplary embodiment.

Use of relatively thin sleeves 118, 218, 320, 326 allows for rapid cooling (e.g., on the order of milliseconds, as further discussed with regard to the process shown in FIG. 7) of the sleeves 118, 218, 320, 326 during manufacturing and thereby allowing the sleeves 118, 218, 320, 326 to quickly conform the core elements. A caterpuller, such as the caterpuller 410, may facilitate holding core components in a particular configuration while the sleeves 118, 218, 320, 326 cool, but may be unnecessary and therefore not present in other cabling applications including the sleeves 118, 218, 320, 326. For example, such a device may be unnecessary to form the sleeves 118, 218, 326 because the underlying assembly is fixed.

Subsequent to the application of the sleeves 118, 218, 320, the cable manufacturing process may further include applying the thicker jacket 124, 222, 322, 332 to the exterior of the sleeves 118, 218, 320 (directly contacting or exterior thereto but not contacting), thereby improving robustness and/or weather-ability of the corresponding cable 110, 210, 310 beyond the protection provided by the sleeves 118, 218, 320. In other contemplated embodiments, the core assemblies, surrounded by the sleeves 118, 218, 320 may be used and/or sold as a finished product, such as sold to cable manufactures that then apply a jacket or for indoor-only fiber optic bundle applications.

In contemplated embodiments, tubes, similar to buffer tubes 312 of a cable core assembly are non-stranded. In some such embodiments, the tubes are more specifically micro-modules or tight-buffered optical fibers that are oriented generally in parallel with one another inside sleeves, such as sleeves 118, 218, 320, 326. For example, harness cables and/or interconnect cables may include a plurality of micro-modules, each including optical fibers and tensile yarn (e.g., aramid), where the micro-modules are bound together by the sleeves. Some such cables may not include a central strength member. Some embodiments include multiple cores or sub-assemblies, each bound by a sleeve as disclosed herein, and jacketed together in the same carrier/distribution cable, possibly bound together with another sleeve as disclosed herein. For some such embodiments, techniques disclosed herein for rapid cooling/solidification during extrusion and inducing radial tension in the sleeves 118, 218, 320, 326 for conforming the sleeves 118, 218, 320, 326 to the underlying assembly may be unnecessary for manufacturing and are not performed.

As discussed above, in some embodiments the sleeves 118, 218, 320, 326 of the cable 110, 210, 310 includes powder particles 120, which may be used for providing water blocking and/or for controlling coupling (e.g., decoupling) of adjoining surfaces in the cable 110, 210, 310. In some embodiments, the powder particles 132, 136 have an average maximum cross-sectional dimension of 500 micrometers (µm) or less, such as 250 µm or less, 100 µm or less.

In some embodiments, at least some of the powder particles 136 are coupled directly or indirectly to the sleeves 118, 218, 320, 326 (e.g., attached bound directly thereto, adhered thereto, in contact therewith), such as coupled to a surface of the sleeves 118, 218, 320, 326, coupled to an exterior surface of the sleeves 118, 218, 320, 326, coupled to an outside surface of the sleeves 118, 218, 320, 326 and/or an inside surface of the sleeves 118, 218, 320, 326. According to an exemplary embodiment, at least some of the powder particles 136 are partially embedded in the sleeves 118, 218, 320, 326, such as passing partly through a surrounding surface plane of the sleeves 118, 218, 320, 326 while partially projecting away from the surface of the sleeves 118, 218, 320, 326; or, put another way, having a portion thereof submerged in the sleeves 118, 218, 320, 326 and another portion thereof exposed.

The powder particles 136 may be attached to the sleeves 118, 218, 320, 326 by pneumatically spraying the powder particles onto the sleeves 118, 218, 320, 326, into and outside of the associated extrusion cone, as further discussed below with regard to FIG. 7. The pneumatic spraying may also facilitate rapid cooling of the sleeves 118, 218, 320, 326. In other embodiments, static electricity or other means may be used to motivate the powder particles 136 to embed in the sleeves 118, 218, 320, 326 or otherwise couple thereto. In other embodiments, glues or other attachment means are used to attach the powder particles 120 to the sleeves 118, 218, 320, 326. Use of the sleeves 118, 218, 320, 326 as a carrier for super-absorbent polymer particles may remove a need for water-blocking tape between the core and cable components outside the core, as well as remove a need for binder yarn to hold the water-blocking tape in place. In still other embodiments, powder particles may be present but relatively loose and/or not directly attached to the sleeves 118, 218, 320, 326, such as held in place by tightness of the sleeve over the underlying core assembly. In contemplated embodiments, the sleeves 118, 218, 320, 326 may be coated with a continuous water-blocking material/layer, or may include other types of water-blocking elements or no water-blocking elements.

According to an exemplary embodiment, the powder particles 120 include super-absorbent polymer particles, and the amount of super-absorbent polymer particles is less than 100 grams per square meter of sleeves 118, 218, 320, 326 surface area ($g/m^2$) to which the powder particles are coupled. In some such embodiments, the amount of super-absorbent polymer particles is between 20 and 60 $g/m^2$, such as between 25 and 40 $g/m^2$. According to an exemplary embodiment, the amount of super-absorbent polymer or other water-blocking elements used in the cables 110, 210, 310 is at least sufficient to block a one-meter pressure head of tap water in a one-meter length of the cables 110, 210, 310, according to industry standard water penetration tests, which may correspond to the above quantities, depending upon other characteristics of the respective cables 110, 210, 310, such as interstitial spacing between core elements.

According to an exemplary embodiment, at least some of the powder particles 136 are positioned on an inside surface of the sleeves 118, 218, 320, 326 between the sleeves 118, 218, 320, 326 and the core elements. In addition to blocking water, such placement may mitigate adhesion between the sleeves 118, 218, 320, 326 and the adjacent core elements during manufacturing of the cable 110, 210, 310, such as if the sleeves 118, 218, 320, 326 are tacky from extrusion or other manufacturing approaches, such as laser welding or heat softening. Alternatively or in combination therewith, in some embodiments, at least some of the powder particles 120 are positioned on an outside surface of the sleeves 326 (see FIG. 5).

Powder particles 136 positioned on the outside surface of the sleeves 118, 218, 320, 326 may provide water blocking between the sleeves 118, 218, 320, 326 and components of the cable 210 exterior thereto, such as metal or dielectric armor 122, 328 (FIGS. 1-2 and 5-6) or micro-modules outside the core. The armor 122, 328 may be corrugated steel or another metal and may also serve as a ground conductor, such as for hybrid conductor and fiber optic cables having features disclosed herein. Use of a thin sleeves 118, 218, 320, 326, as described herein, instead of a thicker layer, allows a narrower "light armor" design, where there is no jacket between the armor 138 and the core (such as where jacket 322 is not present).

In some embodiments, the jackets 124, 222, 322, 332 and sleeves 118, 218, 320, 326 may blend together, cohesively bond, or otherwise attach to one another during extrusion of the jackets 124, 222, 322, 332 over the sleeves 118, 218, 320, 326, particularly if the jackets 124, 222, 322, 332 and the sleeves 118, 218, 320, 326 are formed from the same material, without powder particles 136 there between. In other embodiments, the jackets 124, 222, 322, 332 and the sleeves 118, 218, 320, 326 may remain separated or at least partially separated from one another such that each is visually distinguishable when the cable 110, 210, 310 is viewed in cross-section.

According to an exemplary embodiment, the sleeves 118, 218, 320, 326 are continuous peripherally around the core, forming a continuous closed loop (e.g., closed tube) when viewed from the cross-section, as shown in FIGS. 1-6, and are also continuous lengthwise along a length of the cable 110, 210, 310, where the length of the cable 110, 210, 310 is at least 10 meters (m), such as at least 100 m, at least 1000 m, and may be stored on a large spool. In other contemplated embodiments, the cable 110, 210, 310 is less than 10 m long. Use of continuous sleeves 118, 218, 320, 326 may block water from being able to reach the core. In other embodiments, the sleeves 118, 218, 320, 326 include pinholes or other openings.

Referring now to FIG. 7, the sleeve 426 (shown as an extrusion cone contracting about the core 414 along the manufacturing line direction L) may be applied in conjunction with the manufacturing process or method, which may include stranding. In some such embodiments, the core elements, such as buffer tubes 312 (see also FIGS. 5-6) are stranded by extending an oscillating nose piece 416 through a crosshead and into a space 418 surrounded by the extrudate cone of the sleeve 426. In some embodiments, the sleeve 426 is extruded around the core elements 414 immediately after stranding the core elements 414, such as within a distance of at least ten lay lengths (e.g., within six lay lengths) of the strand from the closing point of the core elements 414, where the core elements 414 come together at the trailing end of the stranding machine in the pattern of stranding of the core 414. Close proximity of the stranding machine and the extruder essentially allows the stranding machine to compensate for slipping or unwinding between the stranded elements 414, such as due to the pull of the extrusion cone. In other embodiments, such as with the cables 110, 210 of FIGS. 1-4, the sleeve 426 would be correspondingly extruded over un-stranded components.

An industry-standard definition for the "lay length" of helically stranded elements (e.g., helical lay length) is the lengthwise distance along the cable (and along a central strength member, if present) for a full turn of the stranded elements about the lengthwise axis of the cable (e.g., the length through the center of a single helical spiral). An industry-standard definition for the lay length of reverse-oscillatory stranded elements, such as SZ stranded elements, is the lengthwise distance between reversal points of the strand divided by the sum of turns of the stranded elements (such as turns about a central strength member) between the reversal points, which may include a fraction of a turn; akin to the "average" helical lay length.

In some embodiments, the lay length may be less than 500 meter along the length of the respective cable between reversals in a reverse oscillatory stranding pattern, such as less than 250 mm, such as less than even 100 mm in some embodiments. Between the reversals in at least some such stranded arrangement, the buffer tubes 312 include at least 2 full turns (i.e. complete spirals) around the central axis of the strand, such as at least 3 full turns, and/or even at least 4 full turns. The tightness of the stranding pattern relates to the loading required by the respective sleeve 320. In general, tighter the lay pattern, the greater the torsional loading of the buffer tube 116, 716 away from the central axis of the strand (e.g., central strength member) at the reversals. For example, embodiments disclosed herein may achieve the above-described coupling to the central strength member 316 while undergoing such tight lay patterns with or without binder yarn(s) 318.

In the space 418 and outside the extrudate cone of the sleeve 426, powder particles, such as super-absorbent polymer particles (e.g., Cabloc® GR-111), may be embedded in the sleeve 426 by pneumatic conveyance, such as by being carried and deposited via a spinning vortex of turbulent air flow in a chamber 420 outside the extrudate cone of the sleeve 426 and/or by being drawn into a high-pressure air flow by a venturi nozzle and carried thereby until accelerated and then released from the air flow via a nozzle in or directed to the interior of the extrudate cone of the sleeve 426. According to such an embodiment, momentum of the powder particles 120 causes them to impact walls of the molten extrudate cone of the sleeve 426. The force of impact and the state of the extrudate (e.g., polyethylene) causes the particles to mechanically adhere to the sleeve 426, but may not arrest elongation of the extrudate, permitting the extrudate to continue to draw/shrink to a relatively thin sleeve that may form tightly around the core elements.

Air flows carrying the powder particles may synergistically be used to hasten cooling of the sleeve 426, and may still further be used to shape or thin-out the sleeve 426. Additional flows of cooling fluid 422 (e.g., dry air if associated sleeve 426 surface(s) are with super-absorbent polymer particles; fine water mist or water bath, if surfaces are without super-absorbent polymer particles) may be used to further hasten cooling of the sleeve 426 so that the sleeve 426 will be sufficiently cooled and solidified in order to conform to core elements within fractions of a second. Furthermore, air flows carrying the powder particles may be coordinated on opposite sides of the sleeve 426 to control shaping of the sleeve 426 and/or prevent distortion of the sleeve 426. Adherence of the particles to the sleeve 426 may assist containing the particles during cable end- and mid-span access.

In some embodiments, the sleeve 426 is continuous and watertight, which may prevent the powder particles (e.g., super-absorbent polymer particles) in the interior of the sleeve 426 from absorbing moisture or water on the exterior of the sleeve 426. To prevent axial migration of water along the exterior of the sleeve 426, between the sleeve 426 and additional cabling layers—such as metallic armor, nonmetallic armor, additional strength elements, and/or an additional exterior jacket over the cable core; the powder particles may be applied to the exterior of the sleeve 426 while the sleeve 426 is still molten and immediately prior to receipt of the cable core 414 by an anti-torsion caterpuller 410. The caterpuller 410 may be particularly useful for reverse-oscillatory stranding patterns, such as so-called "SZ" strands, because the caterpuller 410 holds down and constrains the reversal. As such, the caterpuller is preferably positioned within a distance of at least one lay length of the strand from the closing point of the core elements 414 (e.g., buffer tubes 312), where the core elements 414 come together at the trailing end of the stranding machine (e.g., nose 416) in the pattern of stranding of the core 414. The extrudate cone is located between the stranding machine and the caterpuller 410.

Still referring to FIG. 7, a method of manufacturing a fiber optic cable may include one or more steps, such as a step of stranding core elements 414 about a central strength member, forming a sleeve 426 to surround the core elements 414, conforming the sleeve 426 to the exterior shape of the core as the sleeve 426 solidifies and contracts, and/or extruding a jacket of the cable 110, 210, 310 to surround the sleeve 426. The jacket may be thicker than the sleeve 426. The core elements 414 include a tube surrounding at least one optical fiber, and may include a plurality of additional core elements, such as at least one of a filler rod and an additional tube, or may simply include one tube, as shown in FIG. 1. In some such embodiments, the method may further include steps of forming the sleeve 426 so that the sleeve 426 is 0.5 mm or less in thickness. As the sleeve 426 cools, such as by a cooling flow of air, and the core may be supported by a caterpuller 320, the sleeve 426 shrinks around the core elements 414 to conform in shape to the core elements 414 such that the core elements 414 are under radial tension T of the sleeve 426. In some such embodiments, the method may further or alternatively include a step of moving powder particles and directing the powder particles toward the sleeve 426, while the sleeve 426 is at least partially fluid (e.g., tacky). At least some of the powder particles are partially embedded in the sleeve 426 upon cooling of the sleeve 426. Such particles may not pass fully through the sleeve 426.

As shown in FIG. 7, water-absorbent powder particles are applied to the interior and exterior of the extrudate cone of the sleeve 426. Residual powder particles may pass through gaps between the core elements 414, such as to the central strength member where the powder particles may be captured by the tubes and other interior surfaces of the core. The cable may be produced with an interior application but without an exterior application of water-absorbent powder particles, vice versa, or with powder particles on both sides. In still other embodiments, the sleeve 426 (or sleeves 118, 218, 320, 326) may be applied with no water-absorbent powder particles, such as where the sleeve 426 functions as an impermeable water-blocking layer, a binder, or other function.

FIG. 7 shows a polypropylene extrusion cone of the sleeve 426 projecting from a crosshead and drawing down over a core 414 of stranded elements during manufacturing of a cable. In some embodiments, the extrusion cone draws down to a thickness of about 0.11 mm or less and the line speed is about 50 meters per minute or faster with a crosshead temperature of about 210° C.±40° C. According to an exemplary embodiment, the polypropylene of the extrusion cone includes a nucleator to facilitate fast recrystallization of the polypropylene. For example, the polypropylene of the extrusion cone is believe to recrystallize at a temperature at least 20° C. higher than high-density polyethylene, and with requiring roughly up to one-third less energy to extrude than high-density polyethylene. In other embodiments, polyethylene or other polymers are used.

According to an exemplary embodiment, the material of the sleeve 426 may be selected such that the melting temperature of the material of the sleeve 426 is less (e.g., at least 30° C. less, at least 50° C. less) than the extrusion temperature (e.g., about 200-230° C.±20° C.) of a corresponding jacket (see FIGS. 1-6) that is subsequently extruded over and/or adjoining the sleeve 426. In some such embodiments, the sleeve 426 melts and/or at least partially blends into the jacket. In other embodiments, the sleeve 426 maintains separation from the jacket by intermediate material, such as super-absorbent polymer particles, armor, etc.

Further, Applicants have found that application of the sleeve 426 at extrusion temperatures above (e.g., at least 30° C. above, at least 50° C. above) the melting temperature of the underlying components (e.g., buffer tubes) does not melt or substantially deform the underlying components. As such, the sleeve 426 may include the same or similarly-melting polymers as underlying components or adjoining components. Further, Applicants have found very little or no sticking between the sleeve 426 and buffer tubes stranded in the core, presumably due to the rapid cooling techniques disclosed herein, such as actively directing a flow of cooling air, a water bath, thin film layer, sleeve 426 material selected for solidification/crystallization temperatures of the sleeve 426 close to the extrusion temperature, and/or other techniques.

From a different perspective, the effectiveness of a material for the sleeve 426 may be related to temperature of crystallization, at which crystals start growing and therefore mechanical properties start developing. It is Applicants' understanding that the temperature of crystallization is around 140° C. for nucleated polypropylene, while the temperature of crystallization is at a lower temperature for high-density polyethylene, such as less than 125° C. Applicants theorize that materials that crystallize at higher temperatures will lock down faster and may work better for shape conforming applications as disclosed herein.

Further, it is Applicants' understanding that, to some degree, draw-down of the materials continues until the glass-transition temperature is reached. In the case of polypropylene, glass-transition temperature may be reached about −10° C. and for polyethylene −70° C. (but may be as high as −30° C.). Accordingly, such low temperatures will not likely be reached in processing/manufacturing, so the sleeve 426 may actively continue to shrink post-processing (until glass-transition temperatures are reached), which may further improve shape conformance and providing a closed or limited path for water flow. For other possible sleeve 426 materials, such as polybutylene terephthalate, with a glass-transition temperature of about 50° C., the normal force applied to the stranded elements may be less because the sleeve 426 may stop actively shrinking or having a bias to shrink.

Further, Applicants have found that the greater strength of polypropylene relative to polyethylene allows the sleeve 426 to be thinner for a polypropylene sleeve 426. For example, a 0.15 mm sleeve 426 of polyethylene was found to have about a 70 N radial force, while a 0.15 mm sleeve 426 of polypropylene had about an 85 N radial force, where radial force corresponds to hoop stress and the tightness of the sleeve 426 around the underlying component(s). However, polyethylene is typically considerably less expensive than polypropylene, and in other embodiments, polyethylene may be used for the sleeve 426.

In some embodiments, the sleeve 426 is formed from a first material and the jacket 434 is formed from a second material. The second material of the jacket 434 may include, such as primarily include (>50% by weight), a first polymer such as polyethylene or polyvinyl chloride; and the first material of the sleeve 426 may include, such as primarily include, a second polymer, such as polypropylene. In some embodiments, the first material further includes the first polymer (e.g., at least 2% by weight of the first polymer, at least 5% by weight, at least 10% by weight, and/or less than 50% by weight, such as less than 30% by weight). Inclusion of the first polymer in the first material of the sleeve 426, in addition to primarily including the second polymer in the first material, may facilitate bonding between the first and second materials so that the sleeve 426 may be coupled to the jacket 434 and may be automatically removed when the jacket 434 is removed, such as at a mid-span cable access location.

The tubes (e.g., buffer tubes, jackets, sheathing, armor) disclosed herein may include polypropylene, polyvinyl chloride, polycarbonate, polybutylene terephthalate, and/or other polymers. Fillers, additives, and other components may be added to the polymers. According to an exemplary embodiment, at least some of the buffer tubes 312 have an outer diameter that is 3 millimeters or less, such as 2.5 millimeters or less, or even 2 millimeters or less. The buffer tubes 312 may have an average wall thickness of at least 100 micrometers, such as at least 200 micrometers, and/or less than a millimeter. Each buffer tube 312 may include at least one optical fiber 314, such as at least four optical fibers 314, such as at least twelve optical fibers 314. The optical fibers 314 may be single mode optical fibers, multi-mode optical fibers, multi-core optical fibers, plastic optical fibers, optical fibers having a uniform cladding, and/or other types.

Additionally, the optical fibers disclosed herein, either loose, in ribbons, or otherwise arranged, may be bend-resistant optical fibers having a cladding that includes annular layers of differing refractive indices or other types of bend-resistant optical fibers. An example of a bend-insensitive, or bend resistant, optical fiber is ClearCurve® Multimode fiber commercially available from Corning Incorporated of Corning, N.Y. In some such embodiments, when bent into a coil having a single turn with a diameter of about 200 millimeters, the optical fibers have a change in optical attenuation (delta attenuation) at 1310 nanometers of about 0.1 dB or less per turn, and more preferably about 0.03 dB or less per turn, where the above delta attenuation is observed at one or wavelengths preferably greater than or equal to 1500 nm, in some embodiments also greater than about 1310 nm, in other embodiments also greater than 1260 nm. Use of bend-resistive optical fibers may facilitate improved optical performance of the associated cable, such as when the cable is stretched.

Figure 8:
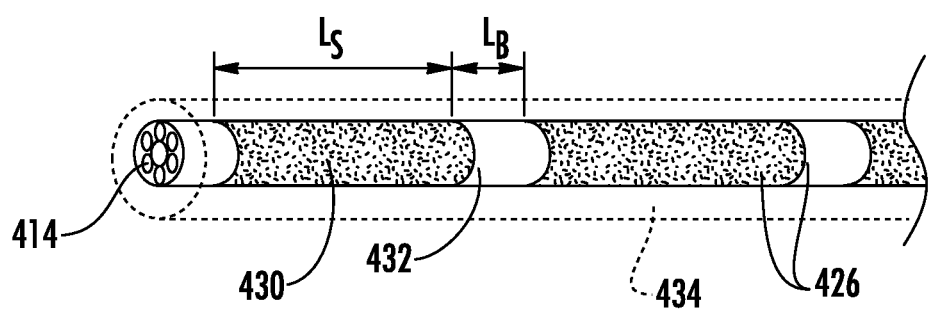
FIG. 8 is a schematic diagram of a cable having discrete lengthwise segments of water-blocking material according to an exemplary embodiment.

Referring now to FIG. 8, the cable core 414 is surrounded by a sleeve 426, as discussed above. The sleeve 426 includes segmented lengths 430 supporting water-blocking powder as disclosed herein, spaced apart by bare lengths 432 without powder or with considerably less powder. According to an exemplary embodiment, the bare lengths 432 form a full loop radially around the sleeve 426 to isolate or parse the adjoining segments 430 that support water-blocking powder. The shape of the loops and segments 430, 432 may be non-uniform instead of necessarily annular or cylindrical, as shown. As mentioned, the sleeve 426 may be formed from a polymer, such as a thin film of extruded polyethylene, polypropylene, etc., which does not wick water through itself; in contrast to many nonwoven materials that may form conventional water-swellable tapes and yarns. Although shown with the cable core 414, any of the sleeves disclosed herein may include the segmented lengths 430, 432 to impede slow migration of water through a cable.

As such, slow water migration in the presently disclosed cables may be blocked by the intermittent and isolated spacing of the segmented lengths 430 supporting water-blocking powder. For example, if a jacket 434 of the cable is breached, water-swellable powder of a segment 430 may absorb water entering the jacket 434 and clog or block off the flow path for the water within the cable. Because the underlying film material (substrate) is non-wicking, slow migration of the water halts or is greatly reduced in rate of propagation at the end of a segment 430 and/or upon reaching the adjoining bare lengths 432 that do not wick.

The length $L_B$ of the bare section 432 is long enough so that the fully expanded powder (e.g., sodium polyacrylate powder, super-absorbent polymer powder) does not swell and extend between segments 430 supporting water-blocking powder. This distance may vary depending upon the interior free space of the cable, the concentration of water-swellable powder, and the absorption capacity of the particular type of water-swellable powder. In some embodiments, the average length $L_B$ of bare segments 432 (i.e. distance between segments 432 supporting water swellable powder) for a 100 meter section of the cable is at least 10 mm, such as at least 50 mm. The bare segments 432 can be manufactured by temporarily blocking or rerouting the flow of water-swellable powder delivered to the extrusion cone, as shown in FIG. 7. The average length Ls of the water-blocking segments 430 may be at least 10 mm, such as at least 50 mm.

According to an exemplary embodiment, the powder particles of the segments 430 include super-absorbent polymer particles, and the amount of super-absorbent polymer particles is at least 20 and/or less than 100 grams per square meter of sleeve surface area ($g/m^2$) to which the powder particles are coupled. In some such embodiments, the amount of super-absorbent polymer particles is between 20 and 60 $g/m^2$, such as between 25 and 40 $g/m^2$. In the bare segments 432, the concentration of powder is substantially less, such as less than 10 $g/m^2$, such as less than 5 $g/m^2$, where the lesser concentration reduces the rate of slow migration of water through the cable passing between individual particles of powder.

Figure 9:
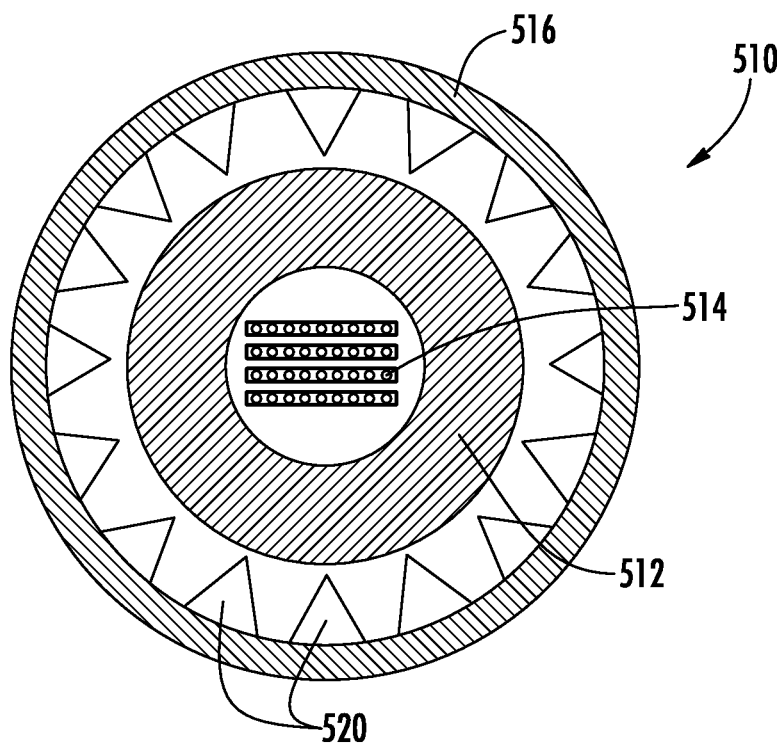
FIGS. 9-10 are schematic cross-sectional diagrams of a cable component and contracting sleeve with powder particles according to an exemplary embodiment.
Figure 10:
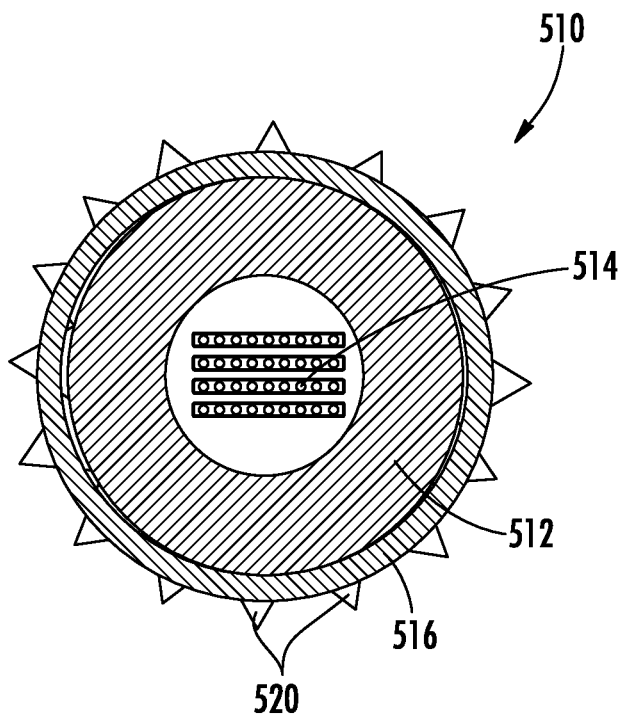

Referring now to FIGS. 9-10, a cable 510 includes a core assembly, including a tube 512 surrounding optical fibers in the form of ribbons 514. A sleeve 516 surrounds the tube 512. In FIG. 9, the sleeve 516 has been recently extruded (see generally extrusion cone 426 of FIG. 7), and has not fully drawn-down and solidified. Powder particles 520, such as jagged and/or hard particles of super-absorbent polymer having an average particle size of at least 200 microns in some embodiments, are initially positioned on an interior of the sleeve 516, as shown in FIG. 9. As the sleeve 516 cools and contracts, as shown in FIG. 10, the powder particles 520 break through the sleeve 516 and are accessible on an opposing (outside) surface of the sleeve 516, as shown in FIG. 10. Thinner sleeves, as disclosed above, may allow for easier particle penetration, as well as sleeves that are filled, such as will talcum powder or another inorganic filler. In some such embodiments, the sleeve 516 holds the particles 520 to the tube 512, while still exposing the particles 520 to block the flow of water passing outside of the tube 512 and the sleeve 516. In such an embodiment, the sleeve 516 may not be water-impermeable. In other embodiments, powders are attached pneumatically, as disclosed above, through adhesives, or otherwise attached to one side and/or the other side of the sleeve 426, not through the sleeve 426).

The construction and arrangements of the cables, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. In contemplated embodiments, fire retardant powders (e.g., aluminum trihydrate, magnesium hydroxide) or dry lubricant powders (e.g., graphite, talcum) may be used in conjunction with and/or in place of water-swellable powders. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A fiber optic cable, comprising:
   a core assembly comprising:
   an optical fiber, and a tube through which the optical fiber extends;
   a polymeric sleeve surrounding the core assembly, wherein the polymeric sleeve is continuous peripherally around the core assembly, forming a continuous closed loop when viewed in cross-section, and continuous lengthwise along a length of the cable that is at least 10 meters, wherein the polymeric sleeve conforms to an exterior geometry of the core assembly, thereby limiting the space for water to flow between the polymeric sleeve and the core assembly;
   water-swellable powder partially embedded in the polymeric sleeve such that the particles of the water-swellable powder have a portion thereof submerged in the polymeric sleeve passing partly through a surface plane of the polymeric sleeve and another portion thereof exposed partially projecting away from the surface plane of the polymeric sleeve; and
   a jacket surrounding the polymeric sleeve.

2. The fiber optic cable of claim 1, wherein the polymeric sleeve directly surrounds the tube and conforms to shape of the tube.

3. The fiber optic cable of claim 2, wherein the cable is a central tube cable, and wherein the tube is positioned in the center of the cable when viewed in cross section.

4. The fiber optic cable of claim 2, wherein the polymeric sleeve is tightly drawn onto the tube such that the polymeric sleeve has a positive hoop stress when the cable is straight and at room temperature of about 21° C.

5. The fiber optic cable of claim 1, wherein the polymeric sleeve is water-impermeable.

6. The fiber optic cable of claim 5, wherein the polymeric sleeve includes segments supporting water-swellable powder separated from each other in a lengthwise direction by bare segments.

7. The fiber optic cable of claim 6, wherein the average length of the bare segments in a 100 meter section of the cable is at least 10 mm.

8. The fiber optic cable of claim 6, wherein the segments supporting water-swellable powder are more specifically supporting super-absorbent polymer particles.

9. The fiber optic cable of claim 8, wherein the concentration of super-absorbent polymer particles in the segments supporting water-swellable powder is at least 20 grams per square meter of sleeve surface area to which the super-absorbent polymer particles are coupled while the bare segments have less than 10 grams per square meter, on average in a 100 meter section of the cable.

10. The fiber optic cable of claim 9, wherein the concentration of super-absorbent polymer particles in the segments supporting water-swellable powder is less than 100 grams per square meter, on average in the 100 meter section of the cable.

11. The fiber optic cable of claim 1, wherein particles of the water-swellable powder penetrate the polymeric sleeve, passing entirely through the sleeve.

12. The fiber optic cable of claim 11, wherein the particles penetrating the polymeric sleeve have an average particle size of at least 200 micrometers.

13. A fiber optic cable, comprising:
a core assembly comprising an optical fiber;
a polymeric sleeve surrounding the core assembly, wherein the polymeric sleeve is continuous peripherally around the core assembly, forming a continuous closed loop when viewed in cross-section, and continuous lengthwise along a length of the cable that is at least 10 meters, wherein the polymeric sleeve comprises:
water-swelling segments extending lengthwise along the polymeric sleeve supporting water-swellable powder;
bare segments, wherein the bare segments extend radially around the full perimeter of the sleeve and are located between the water-swelling segments in the lengthwise direction; and
a jacket surrounding the polymeric sleeve.

14. The fiber optic cable of claim 13, wherein for a 100-meter long section of the cable, the bare segments therein provide an average separation between the water-swellable segments in the section of at least 10 mm.

15. The fiber optic cable of claim 13, wherein particles of the water-swellable powder are partially embedded in the polymeric sleeve such that the particles of the water-swellable powder have a portion thereof submerged in the polymeric sleeve passing partly through a surface plane of the polymeric sleeve and another portion thereof exposed partially projecting away from the surface plane of the polymeric sleeve.

16. The fiber optic cable of claim 13, wherein the segments supporting water-swellable powder are more specifically supporting super-absorbent polymer particles.

17. The fiber optic cable of claim 16, wherein the concentration of super-absorbent polymer particles in the segments supporting water-swellable powder is at least 20 grams per square meter of sleeve surface area to which the super-absorbent polymer particles are coupled while the bare segments have less than 10 grams per square meter, on average in a 100 meter section of the cable.

18. The fiber optic cable of claim 17, wherein the concentration of super-absorbent polymer particles in the segments supporting water-swellable powder is less than 100 grams per square meter, on average in the 100 meter section of the cable.

19. The fiber optic cable of claim 13, wherein particles of the water-swellable powder penetrate the polymeric sleeve, passing entirely through the sleeve.

20. The fiber optic cable of claim 19, wherein the particles penetrating the polymeric sleeve have an average particle size of at least 200 micrometers.

* * * * *